Oct. 30, 1951 H. E. EISNER 2,572,998
APPARATUS FOR PRODUCING PELLETS
Filed July 23, 1948 3 Sheets-Sheet 1
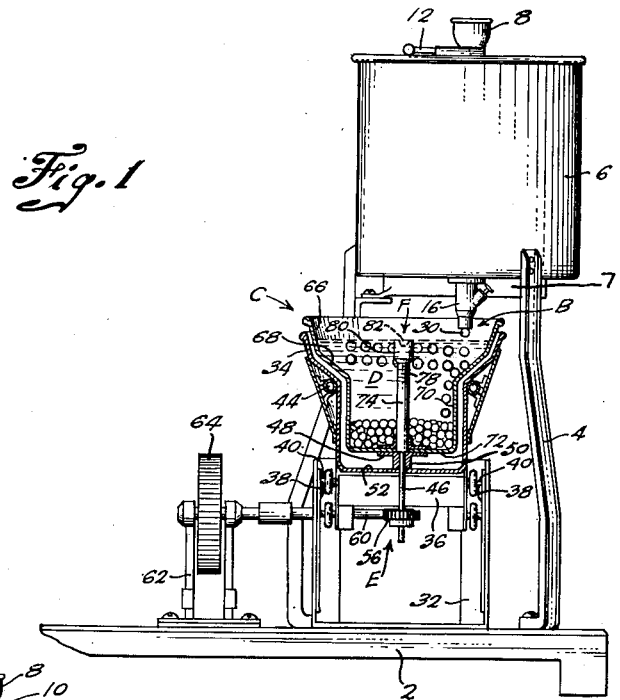
INVENTOR.
HANS EDWARD EISNER
BY
James and Franklin
ATTORNEYS.

Oct. 30, 1951        H. E. EISNER        2,572,998

APPARATUS FOR PRODUCING PELLETS

Filed July 23, 1948        3 Sheets-Sheet 2

INVENTOR.
HANS EDWARD EISNER
BY James and Franklin
ATTORNEYS.

Oct. 30, 1951  H. E. EISNER  2,572,998
APPARATUS FOR PRODUCING PELLETS
Filed July 23, 1948   3 Sheets-Sheet 3
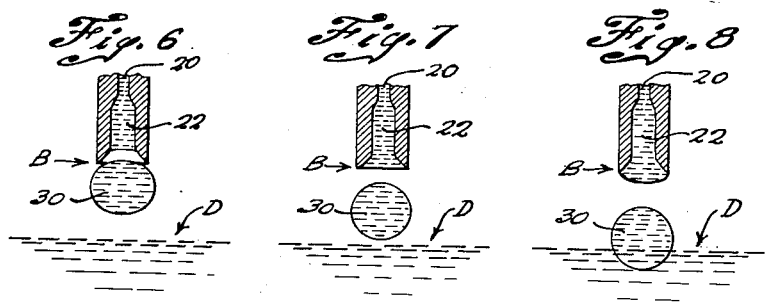
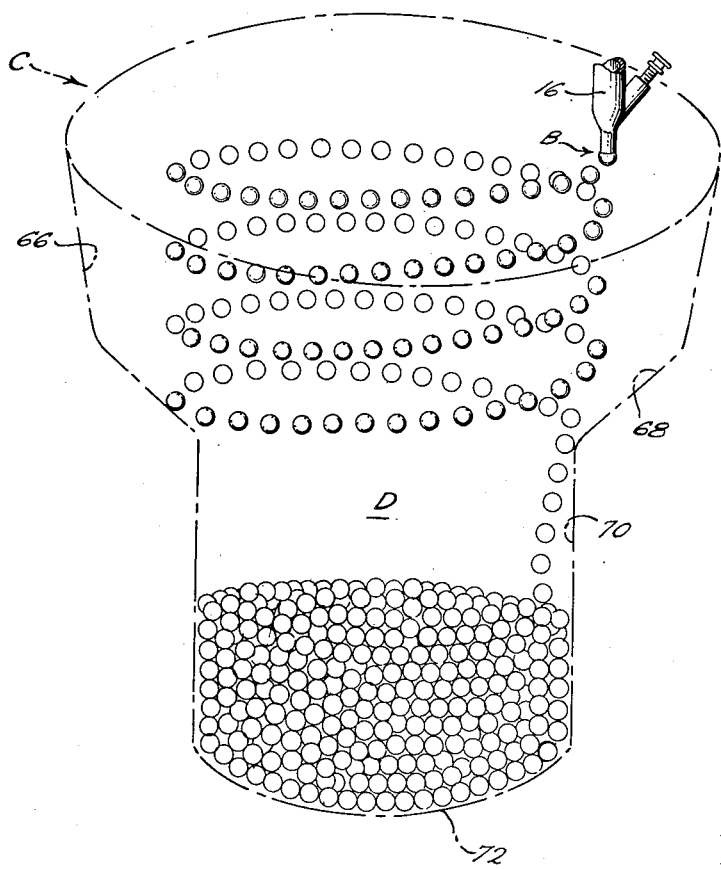
INVENTOR.
HANS EDWARD EISNER
BY
James and Franklin
ATTORNEYS.

Patented Oct. 30, 1951

2,572,998

UNITED STATES PATENT OFFICE 2,572,998

APPARATUS FOR PRODUCING PELLETS

Hans Edward Eisner, Scarsdale, N. Y., assignor to Metropolitan Consulting Chemists, Inc., Scarsdale, N. Y., a corporation of New York Application July 23, 1948, Serial No. 40,243

6 Claims. (Cl. 18—2.4)

The present invention relates to an apparatus for producing pellets.

Dosage and intake of various vitamin, dietetic or medicinal substances are facilitated when those substances are available in the form of pills or pellets. In the case of those pharmaceutical products which are highly concentrated, such as fish liver oils, which are the main source of vitamins A and D, the individual dosage for dietetic, preventive, and therapeutic purposes is very small. Hence, these substances are typical of those which are preferably prepared in the form of small pellets or globules. In order that dosage may be accurately controlled it is desirable that these globules be of uniform size, and because of the unpleasant taste of the fish liver oils it is desirable that they be in a form and of a size which renders them swallowable whole so that they need not be bitten into, since biting releases the unpleasant tasting substances. In the field of animal husbandry, it is desirable that poultry and cattle feed be fortified by the addition thereto of vitamin containing oils in very small units, the smallness of the units preventing the animals from picking out some elements of the feed and leaving the vitamin particles behind. It will be understood that these are but a few examples of the applications to which the present invention may be adapted.

It has long been known that pellets of this type may be produced by forming drops of the therapeutic substance and by permitting those drops to fall into and through a non-reacting bath maintained at such a temperature that the drops harden as they fall through the bath. The specific gravity of the bath is preferably such as to slow the fall of the pellets so that, when they reach the bottom of the bath, they are in a hardened form. Two prime difficulties have presented themselves in this prior art method, these being the low rate of productivity thereof and the difficulty in producing truly spherical pellets.

The first difficulty arises from the fact that if two drops touch one another before they have completely hardened, they will tend to coalesce or join together, thus destroying the objective of producing uniform sized particles. The coalesced drops cannot be separated one from the other, since if they are broken apart, they will not both be of the same size and, if the drops are coated, the coating will not extend completely around each of the broken off particles. Hence, any drops which coalesce with other drops must be discarded. This constitutes a prime source of waste which adds to the expensiveness of manufacture of the pellets. In order to prevent the pellets from coalescing, the drops previously had to be formed with relative long intervals therebetween so that when a drop falls into the hardening bath, it will not touch the drop which has just preceded it or be touched by the drop which just follows it. Since the hardening bath is normally of a specific gravity such that the drops will fall therethrough at a reduced speed, this being necessary in order to minimize the height of the bath, when a drop falls through the bath, it moves at a rate much less than its rate of fall through the air. Consequently, if a second drop be formed immediately after the first drop, it will fall rapidly through the air and catch up with the first drop, which has been slowed down by its contact with the bath, unless a relatively large interval between drops be provided. This large interval necessarily brings about reduced productivity.

When drops are formed, they do not have a spherical shape but instead assume, when they are formed from customary orifices, a tear drop shape. As the drops fall through the air, their surface tension causes them to oscillate between that tear drop shape and a relatively flattened shape. If they are permitted to fall for any appreciable distance, their velocity, when they hit the surface of the bath, is such that they tend to splatter or flatten out and hence the shape of the pellets formed by customary prior art method are non-uniform and often far from spherical.

It is the prim object of the present invention to devise an apparatus which will permit of a greatly increased production rate of such pellets.

It is another prime object of the present invention to devise an apparatus which will permit of the production of uniformly sized pellets all of which are of substantially spherical shape.

It is yet another object of the present invention to devise an apparatus for the production of pellets which is small, inexpensive, and simple of construction, yet which ensures the production of uniformly sized spherical pellets at a rate greatly in excess of that obtainable by comparable prior art methods.

The above objectives are achieved, according to the present invention, by causing the drops to fall into the hardening bath at spaced points so that the second drop does not fall directly upon the first drop which just preceded it but instead falls into the bath at a point horizontally translated from the point of impact of the first drop. In this way, the frequency of drop formation may be greatly increased since it is not necessary to wait, in letting fall the second drop, until the first drop preceding it has sunk a predetermined distance below the surface of the bath. The formation of spherical drops of uniform size and shape is ensured by forming the drops at a suitably shaped orifice so that the drops are more nearly spherical than is ordinarily the case, and by permitting those drops to fall only a very small distance so that surface tension causes the drops to assume a substantially spherical shape and so that the velocity of the drops when they hit the surface of the hardening bath will not be so great as to cause any substantial undesirable deformation of their shape.

To the accomplishment of the foregoing objects and such other objects as may hereinafter appear, the present invention relates to an apparatus for producing pellets as defined in the appended claims and as described in this specification, taken together with the accompanying drawings, in which:

Fig. 1 is a front view, partially in cross-section, of an embodiment of the apparatus of the present invention;

Fig. 2 is a side view thereof;

Figs. 6, 7 and 8 are idealized drawings illustrating the shape and change in shape of a drop as it falls to the surface of the hardening bath; and Fig. 9 is an idealized phantom perspective view of the vat containing the hardening substance, showing the helical path pursued by the pellets as they are hardened, the interior structure of the vat being omitted for clarity.

Broadly viewed, the apparatus for carrying out my invention comprises a container A for a pellet forming substance, a drop forming orifice B constituting an egress from the container A and defining a drop forming station, a movable vat C being positionable below the orifice B and containing a bath D of a pellet hardening substance, and mechanical connections generally designated E for causing relative motion between the bath D and the drop forming station defined by the orifice B. In addition, in order to ensure the formation of substantially spherical pellets, a means F is provided for maintaining the surface of the pellet hardening bath D at a constant level.

Figure 3:
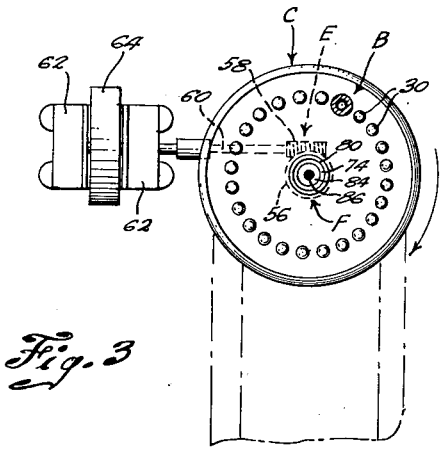
Fig. 3 is a fragmentary top view taken along the line 3—3 of Fig. 2.
Figure 4:
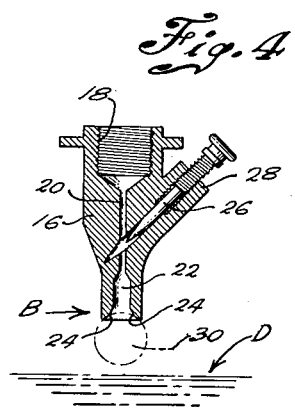
Fig. 4 is a cross-sectional view of the drop forming orifice and the valve associated therewith.
Figure 5:
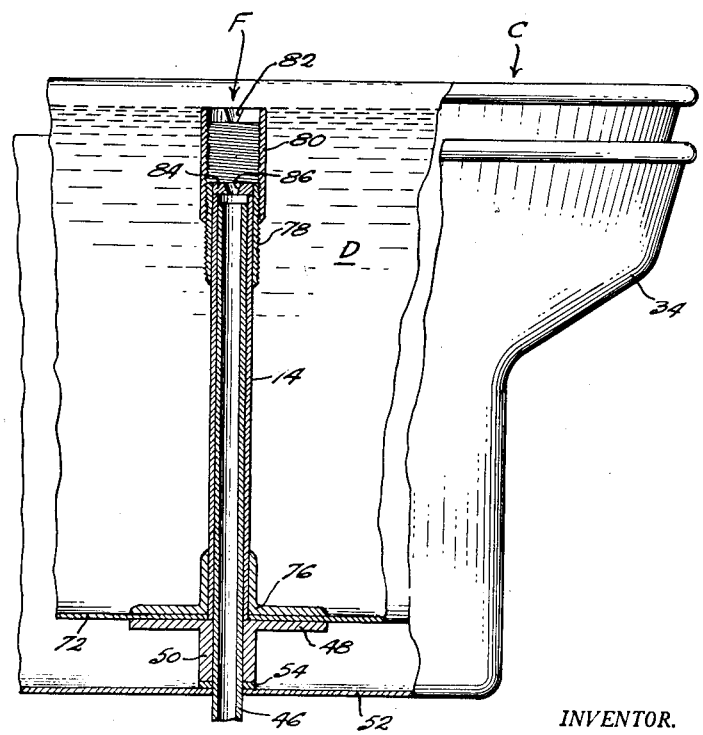
Fig. 5 is a fragmentary view, partially in cross-section, showing the vat for containing the hardening substance and the housing in which the vat is receivable.

In the form here specifically illustrated, the apparatus comprises a base 2 upon which the other portions of the apparatus are mounted. A plurality of legs 4 secured to the base 2 maintain the container A in an elevated position. This container is preferably surrounded by a housing 6 so that the pellet-forming contents of the container A can be maintained at a constant temperature. To this end, any suitable heating means may be mounted on the housing 6, or the housing 6 may constitute a water jacket within which a quantity of suitably heated water may be contained or circulated. A filling funnel 8 may be provided, communicating with the interior of the container A by means of the valve 10, the valve normally being in closed position so as to prevent oxidation or deterioration of the contents of the container A but being openable to permit a new supply of pellet forming substance to be introduced therein. A second valve 12 may be provided, connectable to a suitable pressure source (not shown) in order to ensure ejection of the pellet forming substance from the container A when that is desired. Pressure is particularly advantageous when the pellet forming substance is very viscous or when the supply of pellet forming substance in the container A is so depleted that the hydraulic head above the orifice B is insufficient to ensure formation of drops at the desired rate. Lifting lugs 14 may also be attached to the container A so that it may be removed from and replaced within the housing 6. Depending from the housing 6 and connectable by any suitable means to the container A is a valve housing 16 best shown in Fig. 4. This housing at its upper end is provided with an internally threaded portion 18 engageable with a suitable male fitting on the container A. A vertical bore 20 having an enlarged lower portion 22 provides communication between the interior of the container A and the lower end of the housing 16, the lower end defining the drop forming orifice B. It will be noted that the inner surfaces 24 of the orifice B are rather widely flared, the purpose of this construction being to form a drop which is more substantially spherical than would otherwise be the case. A needle valve 26 threadedly received within the angular extension 28 is effective, in conjunction with the pressure of the pellet forming substance in the container A, to control the rate of formation of drops 30 at the orifice B.

An inclined track 32 is secured to the base 2 and a housing 34 mounted on wheeled carriage 36 is releasably retained in its upper position by means of any suitable retaining mechanism such as the resilient strips 38 which engage with the axles 40 of the carriage 36. The housing 34 may be provided with a handle 42 for ready manipulation and may also have heating elements 44 secured thereon or therein for a purpose hereafter to be described.

An inner overflow pipe 46 projects upwardly through the housing 34 and depends downwardly therefrom. A circular seat 48 may be secured thereto and contained within the housing 34, the hub 50 of the seat 48 resting on the bottom wall 52 of the housing 34 with a friction reducing bushing 54 interposed therebetween. A rotation transmitting element, here shown as a gear 56, is secured to that portion of the pipe 46 which depends below the housing 34. Another rotation transmitting element, here shown in the form of a worm 58, is mounted on shaft 60 which is in turn supported in brackets 62 secured to the base 2 and which has gear 64 connected therewith. Any suitable driving means, such as a motor and gear train (not shown) may be operatively connected to the gear 64 and the worm 58 and the gear 56 are so positioned that they will engage or mesh when the housing 34 is secured in its uppermost position, this position bringing the housing 34 at least partially beneath the drop forming orifice B.

The movable vat C is comparable in shape to the interior of the housing 34 and has a relatively wide top portion 66, an inwardly inclined intermediate portion 68, and a central well portion 70 terminating in bottom wall 72. Centrally disposed within the vat C is an outer overflow pipe 74 adapted to closely fit over the inner overflow pipe 46 and to extend slightly thereabove when the bottom wall 72 of the vat C rests on the seat 48. In order to provide for adequate support, the interior of the vat C may have a rigid flange element 76 similar in size and shape to the seat 48 and positionable thereover. The upper portion of the outer overflow pipe 74 may be externally threaded as at 78 and an internally threaded sleeve 80 may be receivable thereover, the sleeve 80 being vertically adjustable. In order to facilitate this adjustment, internally cut out portions 82 may be provided for the reception of a suitable tool. The top of the outer overflow pipe 74 is covered by a partition 84 having a centrally disposed aperture 86 therein, this aperture being inwardly disposed with respect to the interior of the inner overflow pipe 46.

The described apparatus may vary widely in size depending upon its desired capacity and the type of pellets being formed, but a conception of the size involved may be attained when it is realized that for the production of pellets of approximately 4.6 millimeters in diameter, the diameter of the vat C is approximately 8 inches. In the drawings the apparatus is approximately to scale, but the size of the pellets are exaggerated for purposes of clarity.

The operation of this apparatus will now be described with reference to a particular use thereof, the formation of small pellets of fish liver oil together with wax, but it will be apparent that many other materials may be employed, calling for modifications in the details of operation according to concepts already well known in the art, without any departure from the basic invention.

A preferred composition for the pellet forming substance is 75% fish oil and 25% wax. This substance in the container A is maintained at a temperature such that it will be in a liquid state but the temperature is not so high as to destroy the vitamin content of the fish oil or otherwise deteriorate its characteristics. A typical temperature is 65° C.

The pellet hardening bath D may be composed of any substances which, when maintained at the proper temperature, will provide a bath of a specific gravity so related to the size and density of the drops formed as to cause those drops to fall through the bath at a sufficiently slow rate so that when they have reached the bottom of the bath, they have completely hardened. Another necessary characteristic of the bath D is that it should be chemically inert with respect to the pellet forming substance and that the pellet forming substance must be insoluble therein. A suitable material is a mixture of ethyl alcohol and water containing approximately 66% to 68% alcohol, this material at 20° C. having a specific gravity between 0.86 and 0.88. While ethyl alcohol has been specifically mentioned, other alcohols having similar properties, as well as other substances having similar properties, may be employed. In general, the larger the size of the pellets, the nearer must the specific gravity of the bath D be to the specific gravity of the pellets since the larger the pellet, the longer will it take for the pellet to solidify and hence, for a given size vat C, the slower must be the fall of the drop in the bath D.

The temperature of the bath D must be so controlled with regard to the characteristics of the pellets to be formed that it is sufficiently below the temperature of the drops themselves as to cause the drops to cool and solidify in proper manner. It therefore will be apparent that for a given size pellet of a given composition, the temperature and composition of the bath D may be appropriately varied or adjusted to provide best results. For the ethyl alcohol-water bath above set forth, and for the formation of pellets of 4.6 mm. diameter, the bath D is kept at 35° C. The temperatures above specified for the precise compositions set forth have been found to be reasonably critical but a variation of some one-half to 1° C. on either side of the values given is permissible. Of course, with different compositions, different temperatures would be required.

The needle valve 26 is manipulated so as to open the passage 20 between the orifice B and the interior of the container A so that the fish oil and wax mixture will form drops 30 at the aperture B, the valve 26 being manipulatable to control the rate of formation of the drops 30.

The vat C is placed within the housing 34 when that housing is in its lower right hand position as viewed in Fig. 2, the outer overflow pipe 74 sliding over the inner overflow pipe 46 and the flange reenforcement 76 in the vat C resting on the seat 48 in the housing 34. The vat C is then filled with the bath D which is brought to and maintained at the desired temperature by means of the heating coils 44. The carriage 46 bearing both the housing 34 and the vat C contained therein is then pushed up the ramp 32 until the resilient catches 38 engage behind the axle 40 so as to retain the vat C in its position illustated in Figs. 1 and 2. During the last short distance of motion of the carriage 36 to this position, the gear 56 meshes with the worm 58 and that mesh continues so long as the carriage 36 is retained in its raised position. The gear 64 is then rotated by any appropriate means, this giving rise to rotation of the worm 58, of the gear 56, of the inner overflow pipe 46 to which the gear 56 is attached, of the seat 48, and hence of the vat C. The speed of this rotation may be varied over wide limits and is so correlated with the size of the vat C, the rate of formation of the drops 30 at the orifice B, and the character of the liquid constituting the bath D, that as each drop forms and separates from the aperture B, it falls onto a point on the upper surface of the bath D horizontally spaced from the point where the preceding drop 30 fell and also spaced from the point where the succeeding drop 30 will fall. Hence, it is not necessary that the drops 30 be formed so slowly that each drop has an opportunity to sink completely under the top surface of the bath D by a considerable distance before the next drop falls into the bath in order to prevent coalescing of successive drops. This delay was formerly necessary because each drop would fall on the exact spot where the preceding drop fell. By means of the hereindescribed arrangement in which the vat C is rotated, each drop falls at a point on the surface of the bath D horizontally spaced from those of the preceding and succeeding drops. Thus, when a vat C of 8 inch diameter is employed, the vat may be rotated at the rate of approximately one revolution in 40 seconds and drops may be formed at the orifice B at the rate of approximately 2 to 3 each second without any coalescing taking place. The speed of rotation must be slow enough so that the bath D follows the vat C without any appreciable turbulence.

Each drop, after it falls into the bath D, falls vertically with respect thereto at a relatively slow rate and at the same time translates or rotates with the bath D so that a series of pellets 30 as they fall through the bath D describe a spiral or helix as can best be seen in Fig. 9. The pellets harden or solidify as they fall from the top surface of the bath D to the inwardly inclined wall 68 of the vat C, and when they reach the wall they are in hard or solidified form. They then roll down this wall into the well portion 70 of the vat C where they remain. It is only when a given pellet reaches the well portion 70 that is comes in contact with any other pellets, and by this time all of the pellets are sufficiently solidified so that no coalescing takes place. It may take approximately 2 to 3 minutes for a given pellet to drop from the top surface of the bath D into the well portion 70 of the vat C.

The capacity of the vat C here described is approximately 3000 pellets of 4.6 millimeter diameter. When this capacity has been reached, the needle valve 26 is closed, the retaining catches 38 are withdrawn, the carriage 36 is moved to its lower right hand position as viewed in Fig. 2, the vat C is removed from the housing 34, and the pellets are then spilled therefrom, the bath D removed from the vat C being recovered and reused.

As soon as the carriage 36 is moved away from the position illustrated in Figs. 1 and 2, the worm 58 disengages from the gear 56 and rotation of the vat C ceases.

During the period that the drops 30 are falling into the vat C, they will displace an equal volume of the bath D and consequently, unless means are taken to prevent this, the upper level of the bath D will correspondingly rise. This rise of level is, however, prevented by means of the overflow pipes 46 and 74 in conjunction with the sleeve 80 vertically adjustably secured to the top of the outer overflow pipe 74. Once the sleeve 80 has been positioned, when the level of the bath D tends to rise above the top of the sleeve 80, the excess bath D will overflow into the interior of the sleeve 80, where it will be caught by the partition 84 and caused to drop downwardly through the aperture 86. Since the aperture 86 is inwardly disposed with respect to the interior of the inner overflow pipe 46, the overflow from the bath D will only pass through the inner overflow pipe 46 and will not pass between the inner and outer overflow pipes 46 and 74. Any suitable receptacle may be positioned below the depending end of the inner overflow pipe 46 to catch the overflow.

Maintaining the upper level of the bath D constant is an important factor, in conjunction with the shape of the orifice B, in obtaining spherical pellets. When drops are formed in ordinary manner from the end of a pipette having an orifice of constant diameter, those drops, when they tear themselves away from the pipette, have an elongated tear drop shape. If such drops are permitted to fall freely for any appreciable period of time, the forces of surface tension will cause the shape of that drop to oscillate between its original tear drop shape and a rather oblate shape, the drop only attaining spherical shape instantaneously and fleetingly during that oscillation. Hence, accurate control of the shape of the pellet is rendered quite difficult. By making the edges 24 of the orifice B flaring, the drops 30, when they separate from the orifice B, do not have the tear drop shape referred to above but instead have an oblate shape as illustrated in Fig. 6. It seems probable that the reason for this phenomenon not only resides in the flaring sides 24 but also is to some extent related to the fact that the head of liquid in the bores 20 and 22 exerts a pressure on the center of the drop as it is forming which inhibits the formation of a trailing point and causes the oblate shape.

If the drop 30 is permitted to fall only a very small distance it has been found that its shape just before it hits the top surface of the bath D is substantially spherical. The optimum distance will vary with the size of the drops and their composition, but it may be stated that this distance is ordinarily of the same order of magnitude as the diameter of the drop, and is preferably not greater than two or three times that diameter. It may even be less than said diameter. Because the distance between the orifice B and the upper surface of the bath D may be accurately controlled by adjustment of the sleeve 80 and because this distance is so small that the drops 30 are not permitted to fall any considerable distance, it is possible by experimentation to accurately control the shape of the drop 30 as it falls into the bath D and to ensure that this shape is substantially spherical and is quite uniform when one drop is compared to the next. Also, because the drops 30 only fall a very small distance, their velocity at the time that they hit the top surface of the bath D is very small and consequently there is no splattering effect which is characteristic of prior art methods and which causes breaking up of the pellets and uncontrollable variations in the size and shape thereof.

It will be apparent from the above description that by the method herein described it is possible to produce pellets of greater consistency as regards shape and size at a more rapid rate than has been possible heretofore. All of the factors entering into the formation of the pellets are under close control and the critical factors, such as the temperatures of the pellet forming substance and of the pellet hardening substance, the rate at which the drops 30 are formed, the speed of rotation of the vat C, and the distance of fall of the drops 30 may all be conveniently regulated so as to ensure optimum results. The apparatus disclosed is simple, small, sturdy and dependable, and is far more inexpensive to produce than comparable apparatus in the prior art. Moreover, the fact that the apparatus is capable of producing pellets at a far greater rate than has heretofore been possible makes the invention of great commercial importance in the field.

While as here specifically illustrated the vat C is rotated, the same results may be achieved by moving the orifice B horizontally with respect to the bath, or by causing relative motion other than circular motion to exist between them. Circular motion has the advantage of smoothness, however, thus leading to a reduced tendency towards turbulence in the bath D. Moreover, productivity might be increased by using a plurality of simultaneously acting orifices B. Many other variations may be made in the details of the method and apparatus herein described all within the spirit of my invention as defined in the following claims.

I claim:

1. Apparatus for producing pellets comprising a base, a container for a pellet forming substance mounted on said base, a drop forming orifice constituting an egress from said container and depending therefrom, a housing on said base and movable thereover between a first position under said orifice and a second position free of said container, a seat within said housing, elements on said housing and said base cooperable when said housing is in its first position to rotate said seat, and a vat removably receivable in said housing on said seat for containing a pellet hardening substance into which the drops from said orifice are adapted to fall.

2. Apparatus for producing pellets comprising a base, a container for a pellet forming substance mounted on said base, a drop forming orifice constituting an egress from said container and depending therefrom, a housing on said base and movable thereover between a first position under said orifice and a second position free of said container, a seat within said housing, an external rotation transmitting element on said housing operatively connected to said seat, a rotation transmitting element on said base cooperable with the element on said housing when said housing is in its first position, said elements being effective to rotate said seat, and a vat removably receivable in said housing on said seat for containing a pellet hardening substance into which the drops from said orifice are adapted to fall.

3. Apparatus for producing pellets comprising a base, a container for a pellet forming substance mounted on said base, a drop forming orifice constituting an egress from said container and depending therefrom, a housing on said base and movable thereover between a first position under said orifice and a second position free of said container, an inner overflow pipe extending upwardly into said housing and having a seat secured thereto and extending below said housing and having a rotation transmitting element secured thereto, a rotation transmitting element on said base cooperable with the rotation transmitting element on said housing when said housing is in its first position, said rotation transmitting elements being effective to rotate said seat, and a vat having an outer overflow pipe receivable over said inner overflow pipe, said vat being removably receivable in said housing on said seat and being adapted to contain a pellet hardening substance into which the drops from said orifice are adapted to fall.

4. The apparatus for producing pellets of claim 3, in which said outer overflow pipe is provided with an adjustable top sleeve for controlling the level of the liquid in said vat.

5. The apparatus for producing pellets of claim 3, in which said outer overflow pipe is closed at the top except for an aperture inwardly disposed with respect to the interior of said inner overflow pipe, so that overflow liquid will not pass between said inner and outer overflow pipes.

6. The apparatus for producing pellets of claim 3, in which said outer overflow pipe is provided with an adjustable top sleeve for controlling the level of the liquid in said vat and in which said outer overflow pipe is closed at the top except for an aperture inwardly disposed with respect to the interior of said inner overflow pipe, so that overflow liquid will not pass between said outer and inner overflow pipes.

HANS EDWARD EISNER.

REFERENCES CITED

The following references are of record in the file of this patent:

UNITED STATES PATENTS

| Number | Name | Date |
|---|---|---|
| 857,756 | Reddy | June 25, 1907 |
| 1,378,084 | Bacon et al. | May 17, 1921 |
| 1,614,636 | Wachtel | Jan. 18, 1927 |
| 1,637,377 | Heicke | Aug. 2, 1927 |
| 1,647,194 | Poindexter et al. | Nov. 1, 1927 |
| 2,137,931 | Craven, Jr., et al. | Nov. 22, 1938 |
| 2,299,929 | Raynolds, Jr. | Oct. 27, 1942 |

FOREIGN PATENTS

| Number | Country | Date |
|---|---|---|
| 657,730 | France | Jan. 16, 1929 |